Patented Nov. 12, 1929

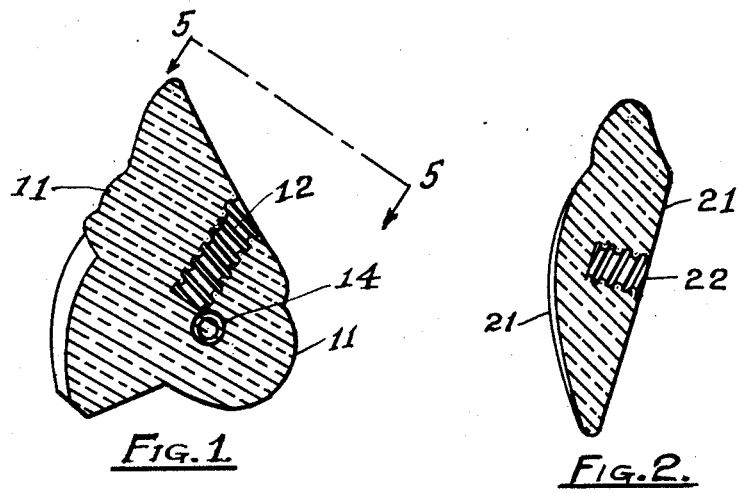
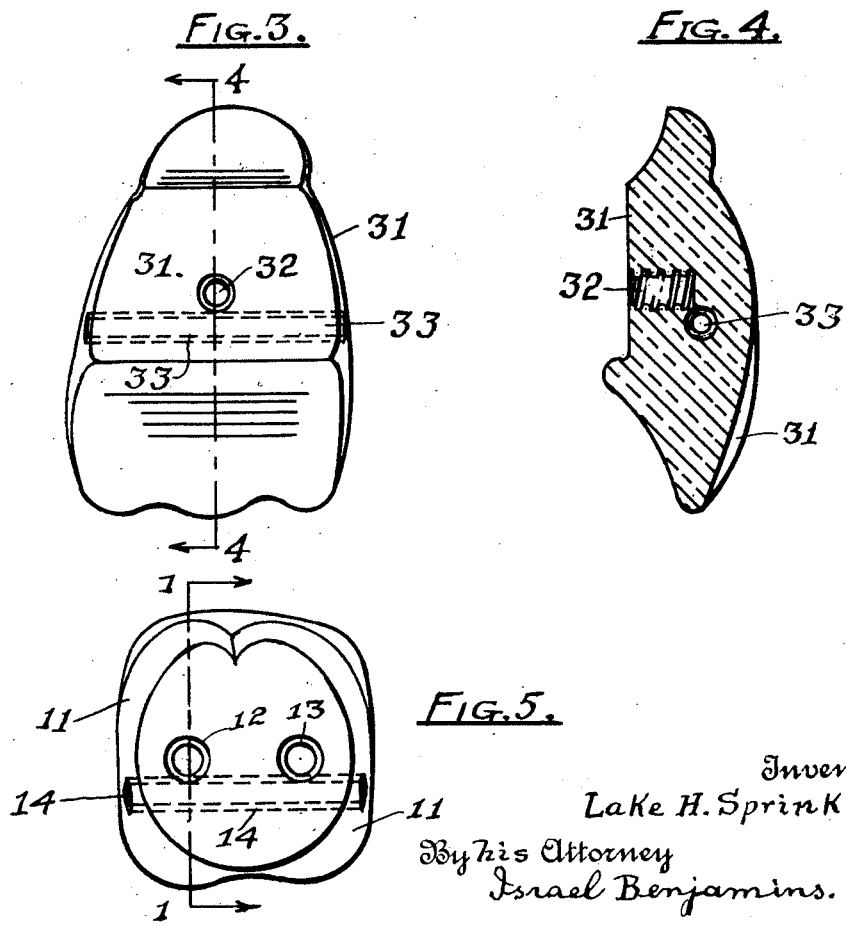

1,735,217

UNITED STATES PATENT OFFICE

LAKE H. SPRINKLE, OF BROOKLYN, NEW YORK

ARTIFICIAL TOOTH AND FACING

Application filed March 20, 1928. Serial No. 263,112.

My invention relates to improvements in artificial teeth and facings, to be used for dental plates and bridges, and it consists in the novel features, which are hereinafter described.

One of the objects of my improvement is—to assist the anchoring of a plate or backing to a tooth or facing.

Another object of my improvement is—to increase the strength and durability of a tooth or facing.

A further object of my invention is—to produce an artificial tooth or facing, having therein an opening of substantially uniform diameter, to fit a corresponding part or projection on the plate or backing.

Another object of my invention is—to have said tooth or facing of a shape, which lends itself to an easy way of producing it.

A further object of my invention is—to produce an artificial tooth or facing adapted to have a more perfect and permanent connection to a plate or backing.

Another object of my invention is—to eliminate platinum pins in artificial teeth or facings.

Other objects and advantages will hereinafter appear.

I attain these objects by the artificial teeth and facings, illustrated in the accompanying drawings, or by any mechanical equivalents or obvious modifications of the same.

In the drawings Fig. 1 is a vertical section of an upper molar tooth, embodying my invention, on the line 1—1 of Fig. 5; Fig. 2 is a central vertical section of an upper anterior facing, embodying my invention. Fig. 3 is an elevation of an anterior plate tooth, embodying my invention, as viewed from the lingual side of the tooth. Fig. 4 is a vertical section of the tooth, shown in Fig. 3, on the line 4—4 of Fig. 3; and Fig. 5 is a projection, in a plane parallel to 5—5, of the tooth, shown in Fig. 1, as viewed in the direction of the arrows.

Like numerals refer to like parts throughout the several views. 11 designates the main body of a molar tooth, which is shown as having therein two threaded main openings: 12 and 13, with rounded threads, as shown in Figs. 1 and 5, and one threaded secondary opening 14. These openings may be formed either by a process, such as described in my co-pending application for a patent for a process of molding artificial teeth and facings, filed March 15, 1928, Serial No. 261,884; or in any other suitable manner.

21 designates the main body of an anterior facing, which is shown in Fig. 2 as having therein one threaded main opening 22, also with rounded threads, for a purpose which is hereinafter described.

31 designates the main body of an anterior plate tooth, which is shown in Figs. 3 and 4 as having therein one threaded main opening 32 and one threaded secondary opening 33.

The secondary openings 14 and 33 are shown as positioned transversely to the main openings 12, 13 and 32 respectively, and serve to aid the anchorage of said main openings, as is hereinafter more fully described.

The diameter of the pitch surfaces of all of the above openings are substantially uniform as shown, thereby rendering easier the process of connecting the said teeth and facings to plates and backings; but the said pitch surfaces may also be tapered, if desired.

The above openings serve for anchoring therein corresponding parts or projections on plates or backings, and the anchoring may be effected by any suitable process or in any suitable way, which may be either standard or special.

By the above main and secondary openings a tooth or facing may be connected to a plate or backing along a number of lines and points, and the connection may thereby be made more perfect and permanent; the teeth and facings also have thereby increased their resistance to stresses of all kinds, and are consequently stronger.

The holding power of threaded openings on projections engaged therein is greater than the power of other openings, which have been used heretofore and which are not threaded.

Platinum pins are unnecessary with the above type of teeth and facings.

It is evident from the drawings that a cross-section of the threads 12 and 22 in Figs. 1 and 2 by a plane passing through the axis of the threads will form a continuously smooth curve. The same is true of a cross-section of the ridges and grooves 32 in Fig. 4 of the drawings.

This is a source of great strength in the tooth or facing, and it also renders easier and safer the connection of a tooth or facing to a backing.

The number of secondary openings and their relative dimensions may be varied; the main openings may also be varied in number and size, and either the main openings or the secondary openings may be omitted, if desired.

The helical threads in said openings may be replaced by alternate circular grooves and ridges in the peripheries of said openings co-axially with the latter, if desired.

Many other changes may be made in the details of my improved artificial teeth and facings, without departing from the main scope of my invention, and parts of my invention may be used without other parts.

I do not, therefore, restrict myself to the details as shown in the drawings; but I intend to include also all mechanical equivalents and obvious modifications of the same within the scope of my invention.

I claim as my invention and desire to secure by Letters Patent:

1. An artificial tooth or facing, having therein one or more threaded openings with rounded threads and grooves therebetween, the cross-section of said threads and grooves forming a continuously smooth curve, for anchoring therein corresponding parts of plate and backings.

2. An artificial tooth or facing, having therein one or more threaded main openings and one or more threaded secondary openings, disposed at an angle to said main openings, for anchoring therein corresponding parts of plates and backings.

3. An artificial tooth or facing, having therein one or more threaded main openings and one or more threaded secondary openings, for anchoring therein corresponding parts of plates and backings, said secondary openings being positioned transversely to said main openings.

4. An artificial tooth or facing, having therein one or more threaded openings with rounded threads and grooves therebetween, the cross-section of said threads and grooves forming a continuously smooth curve, for anchoring therein corresponding parts of plates and backings, the pitch surfaces of said openings being cylindrical surfaces with substantially uniform diameters throughout the greater part of their lengths.

5. An artificial tooth or facing, having therein one or more openings with rounded threads, for anchoring therein corresponding parts of plates and backings, and alternate rounded grooves and rounded ridges in the peripheries of said openings, co-axially therewith the cross-section of said grooves and ridges forming a continuously smooth curve, for enhancing the anchorage of said parts therein.

6. An artificial tooth or facing, having therein one or more main openings, for anchoring therein corresponding parts of plates and backings, one or more secondary openings, to assist in anchoring said parts, and alternate grooves and ridges in the peripheries of said openings, co-axially therewith, for enhancing the anchorage of said parts therein.

LAKE H. SPRINKLE.